Figure 1:
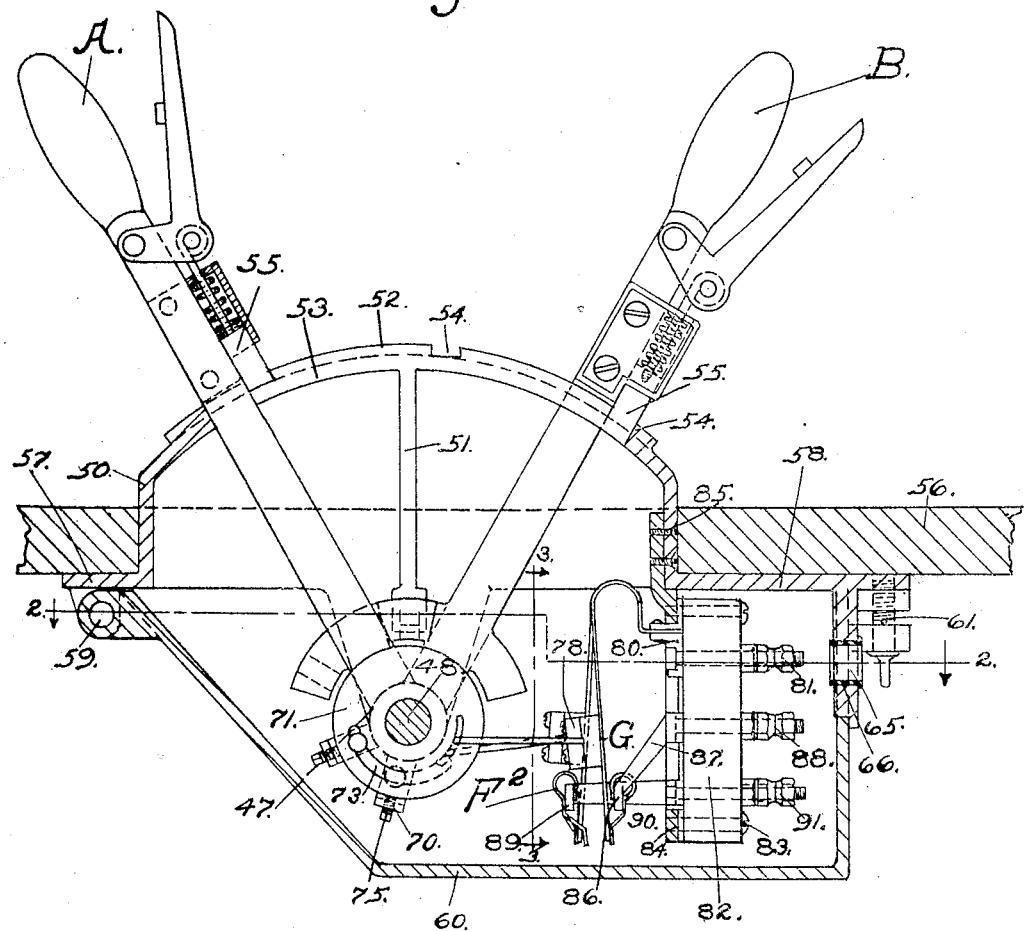

E. W. VOGEL.
TABLE LEVER FOR ELECTRIC SIGNALING APPARATUS.
APPLICATION FILED JULY 18, 1914.

1,247,753.

Patented Nov. 27, 1917.
5 SHEETS—SHEET 1.

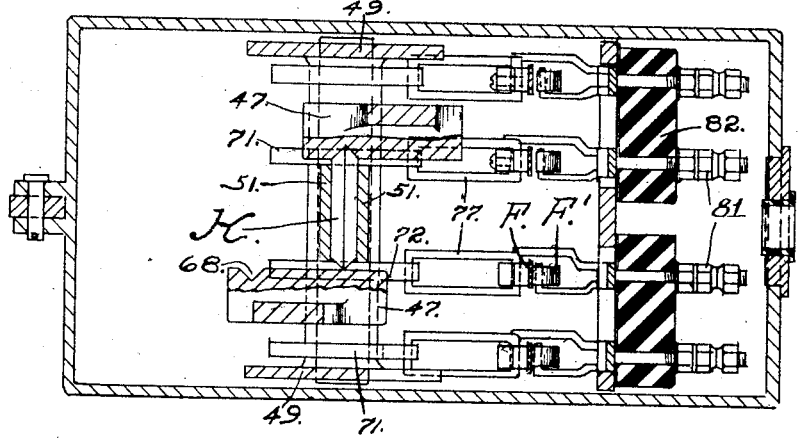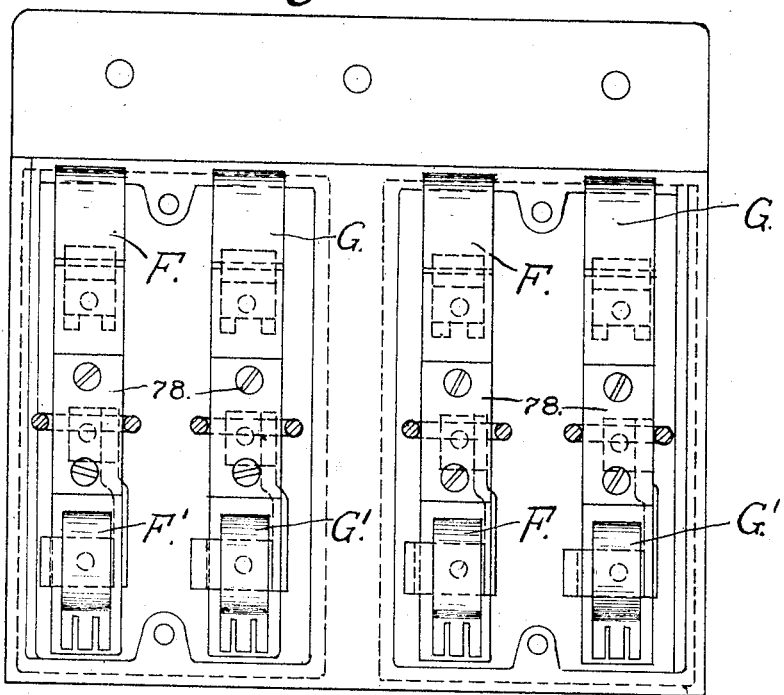

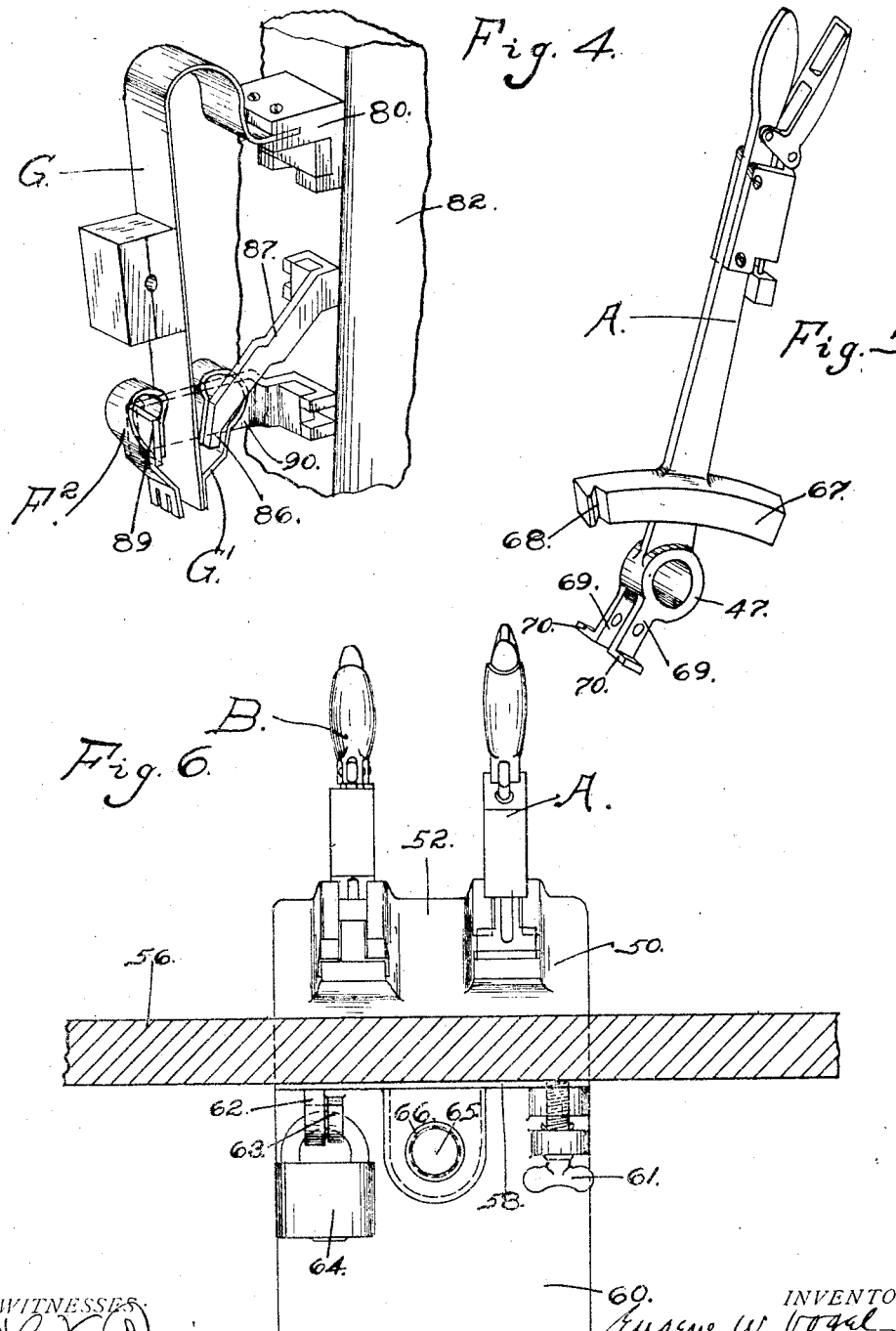

E. W. VOGEL.
TABLE LEVER FOR ELECTRIC SIGNALING APPARATUS.
APPLICATION FILED JULY 18, 1914.

1,247,753.

Patented Nov. 27, 1917.

5 SHEETS—SHEET 4.

WITNESSES:

INVENTOR.
Eugene W. Vogel
BY
ATTORNEY

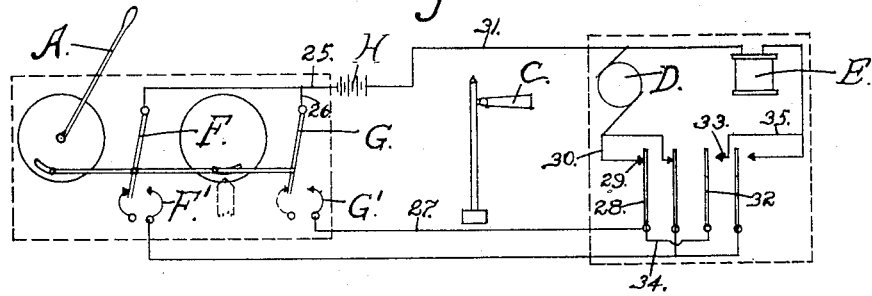
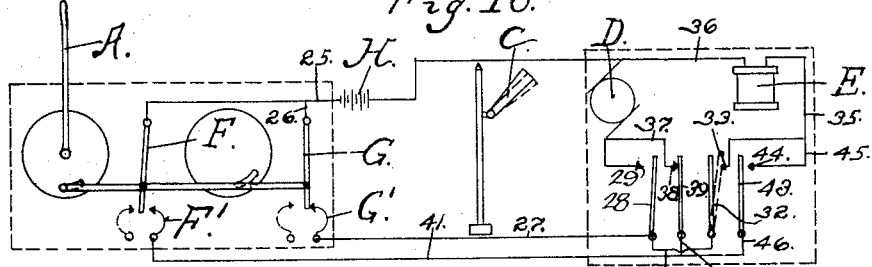
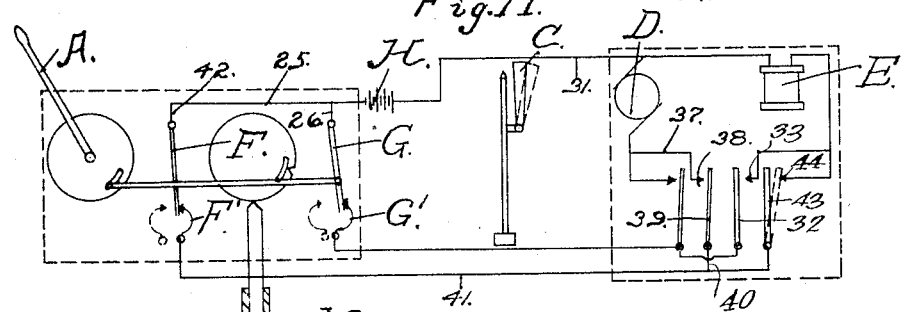
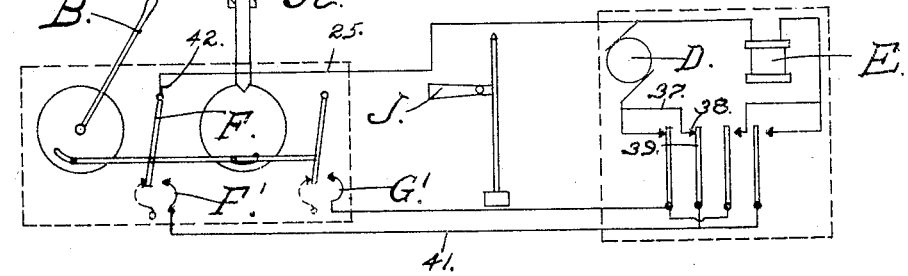

UNITED STATES PATENT OFFICE.

EUGENE W. VOGEL, OF OAK PARK, ILLINOIS, ASSIGNOR TO CHICAGO RAILWAY SIGNAL AND SUPPLY COMPANY, OF CARPENTERSVILLE, ILLINOIS, A CORPORATION OF ILLINOIS.

TABLE-LEVER FOR ELECTRIC SIGNALING APPARATUS.

1,247,753.  Specification of Letters Patent.  Patented Nov. 27, 1917.

Application filed July 18, 1914. Serial No. 851,699.

*To all whom it may concern:*

Be it known that I, EUGENE W. VOGEL, a citizen of the United States, residing at Oak Park, in the county of Cook and State of Illinois, have invented certain new and useful Improvements in Table-Levers for Electric Signaling Apparatus, of which the following is a specification.

My invention relates to a manually operated controlling device adapted to be used for controlling the operation of electrically actuated station or train-order signals, electrically actuated apparatus for throwing the switches or derails, or other apparatus of like character.

The invention has for its principal objects:

To provide a simple, compact device which may be set into the bed of a table, with the levers above the table and the operative mechanisms inclosed in a casing below the same, in such manner that the levers may be readily manipulated while all of the mechanisms controlled thereby are completely housed so that they cannot be accidentally injured or intentionally tampered with.

To provide in a device of this sort an arrangement of the contacts and of means for bringing same together and separating them, which will minimize arcing and make the contacting surfaces self-cleaning so as to insure proper electrical connections at all times.

To provide a controlling device which may be employed for operating either a two-position or a three-position signal, or a similar device, as may be desired.

To provide, in particular, a controlling device for a three-position signaling or like apparatus, by means of which the signal or semaphore arm may be moved from the normal to either of the other two positions by movements of different amplitude of the same lever.

To provide, in a signaling apparatus of this character, two or more controlling levers which are interlocked so that the manipulation of one lever is conditioned upon the position of the other.

To provide a simple and readily manipulated adjustment in the connecting means between the levers and the contacts, whereby the bringing together of the contacts and their separation may be accurately effected at the desired angular positions of the lever.

To provide certain other novel and improved arrangements, devices and constructions relating to controlling means for electrically actuated signaling or other apparatus to be hereinafter described and claimed.

The invention is illustrated, in a preferred form of controlling device utilized for the control of a train-order signal, in the accompanying drawings, wherein—

Figure 7:
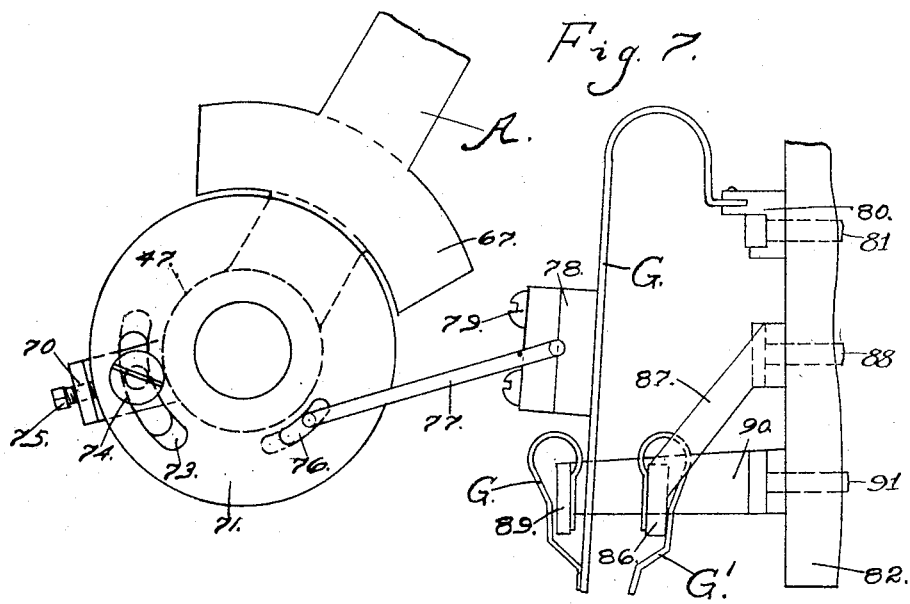
Figure 8:
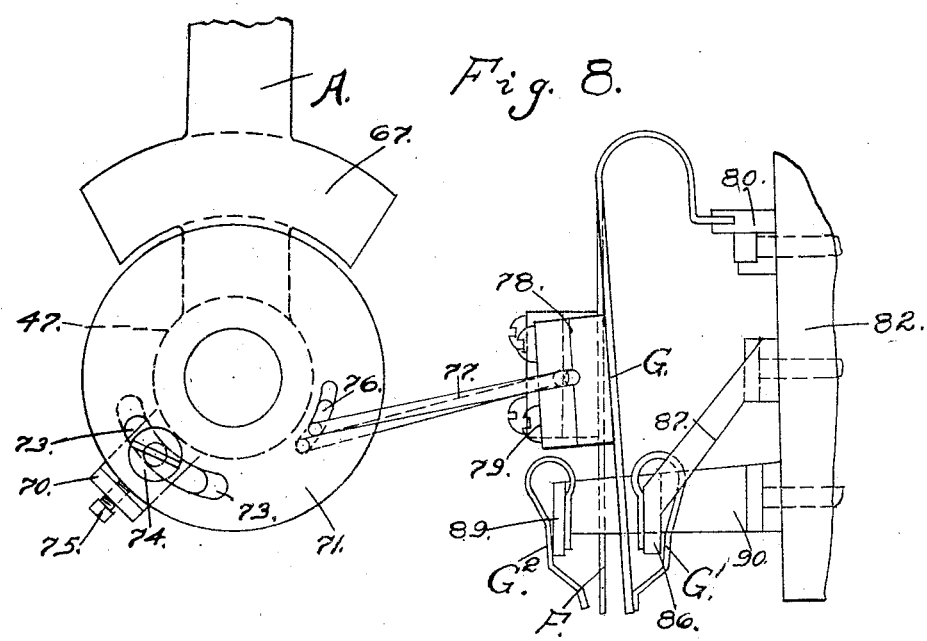

Figure 1 is a longitudinal sectional view taken through the controlling device shown as affixed to the bed of a table;

Fig. 2 a sectional plan taken on line 2—2 of Fig. 1;

Fig. 3, a sectional elevation on line 3—3 of Fig. 1;

Fig. 4, a view, in perspective, of one set of contacts;

Fig. 5, a similar view of one of the controlling levers;

Fig. 6, an end view of the device, showing the table in section, viewed from the right-hand side of Fig. 1;

Figs. 7 and 8, fragmentary views, in elevation, of one of the levers and the contacts controlled thereby, Fig. 7 showing the lever in the normal position and Fig. 8 in the intermediate position;

Fig. 9, a diagram illustrating the application of the controlling apparatus to an electrically actuated train-order signaling apparatus of the "normal danger" type, the parts being shown in the positions which they normally assume;

Fig. 10, a similar diagram showing the position of the parts when the semaphore arm is in the intermediate or "caution" position; and Fig. 11, a similar diagram, the upper portion of which shows the parts of the apparatus in the position which they assume when the signal stands at "clear," the lower portion of the diagram illustrating an apparatus for controlling the signal for the traffic in the opposite direction, this figure being intended particularly to illustrate a signaling system for a single track road.

Like characters of reference designate like parts in the several figures of the drawings.

While the controlling device of my invention might be employed in a variety of different situations, it is of particular utility as forming part of a station or train-order signaling apparatus such as that illustrated diagrammatically in Figs. 9 to 11 inclusive. Before proceeding to describe the mechanical features of the controlling apparatus, brief description will be made of the signaling apparatus shown in these figures.

A designates a lever adapted to assume three positions, thereby causing the semaphore arm C to assume three corresponding positions. With the lever A in the position shown in Fig. 9, the semaphore arm is in its horizontal or "danger" position. With the lever moved to the intermediate position (Fig. 10) the semaphore arm stands at "caution." With the lever A thrown to the position shown in Fig. 11, the semaphore arm is moved to its upright position, indicating a clear track. The raising of the semaphore arm is accomplished by means of a motor D. It is held in the upright or diagonal position by means of a clutch magnet E. These devices and their operative connections with the semaphore arm are well known in this art and will not require illustration and description. It will suffice to point out the electrical connections to the motor and magnet effected by the movements of the controlling lever. The lever A controls the movement of two contact arms F, G, adapted to be brought to bear against contacts F', G' respectively. In the normal position of the parts of the apparatus shown in Fig. 9, the contacts of both pairs are separated. When the lever is moved to the intermediate position (Fig. 10) the contact arm G is brought against the contact G' closing the circuit through the motor D, and actuates the motor to raise the semaphore arm, this circuit being as follows: From battery H, wire 25, 26, contacts G, G', wire 27, contact 28, 29, wire 30, motor D and wire 31. When the semaphore arm has passed through an arc of 43° (dotted line position Fig. 10), a contact arm 32 is brought to bear against a contact 33 closing a circuit through the clutch magnet E which is a shunt from the circuit just described and is as follows: wire 34, contacts 32, 33, wire 35 and wire 36. The energization of the clutch magnet E prevents the return of the semaphore arm. When the semaphore arm reaches a 45° position, contact arm 28 is moved away from the contact 29 opening the motor circuit. The mechanisms for moving the contact arms 28, 32 are not shown or described, as such mechanisms are well understood features of the apparatus for moving the semaphore arm to and holding it in its several positions, schematically shown in Figs. 9 to 11, which, as above stated, is known to those skilled in this art.

It will be observed from Fig. 10 that with the lever A in the intermediate position, contact F stands away from contact F'. When the lever A is moved to the position shown in Fig. 11, contacts G, G', remain together and contact F is brought against contact F'. This closes a circuit through the motor as follows: wire 31, motor D, wire 37, contacts 38, 39 (which are normally together as in Figs. 9 and 10), wires 40, 41, contacts F', F, and wires 42, 25. When the semaphore arm has passed through an arc of 47° contacts 32, 33 separate, cutting out the clutch magnet. When the arm reaches a position at 88° from the horizontal, a contact arm 43 is brought against a contact 44 closing a circuit through the clutch magnet which is a shunt from the motor circuit last traced, and the clutch magnet is thereby actuated to keep the semaphore arm from returning from its "clear" position. This circuit is as follows: wire 36, clutch magnet E, wires 35, 45, contacts 44, 43, wire 46. When the semaphore arm reaches the 90° position, contacts 38, 39 separate, breaking the circuit through the motor. The clutch magnet circuit remains closed until the lever A is returned from the position shown in Fig. 11 to one of the other two positions.

The lower portion of Fig. 11 illustrates the operation of a semaphore arm J for governing the traffic on the track passing in the direction opposite to that governed by semaphore arm C. The controlling mechanism is the same as that operated by lever A. The apparatus for moving the semaphore arm J is exactly like that used for moving the arm C. In order to make it impossible to give contradictory signals at the same time with the arms C and J, a locking dog K is arranged between the controlling device operated by lever A and the controlling device operated by lever B, which dog prevents lever B from being thrown after the lever A has been moved from its normal position, and vice versa.

I will now describe the details of construction of the controlling device of which the levers A and B form a part.

The levers are formed, in each case, with a hub 47 by means of which they are mounted on a shaft 48 supported by webs 49 depending from an upper housing member 50 and by a central web 51 forming a part of the same housing member. The latter has a curved top 52 formed with slots 53 through which the levers work, and with notches 54 to receive the usual spring-pressed locking dogs 55 with which the levers are provided. The upper housing member is adapted to be fitted into an opening in the table top 56 and is formed with flanges 57, 58 projecting under and secured to the under side of the table top. Hinged at 59 to the flange 57 is a lower housing member 60 which is secured at the other end to the upper housing member by a screw bolt 61. Preferably the housing members are formed with lugs 62, 63 perforated for a padlock 64 (Fig. 6). The lower housing member 60 has a small opening 65 provided with a bushing 66 of insulating material, through which pass the wires leading to the controlled apparatus. Each lever is formed with a segmental projection 67 formed with a notch 68. The locking-dog K referred to above is arranged in an opening in the web 51 with notches 68 arranged as shown in Figs. 2 and 5. Either lever may be moved from its normal position, but, one lever having been so moved, it is impossible to throw the other until the first one has been returned.

As the devices and arrangements associated with the two levers, A and B, are the same, it will be sufficient to describe those associated with lever A.

The lever A is provided below the hub 47 with a pair of lugs 69 formed with angularly disposed projections 70. On the shaft 48, on opposite sides of the lever, are disks 71, 72, formed with arcuate slots 73 through which extend set-screws 74 binding the disks to the adjacent lugs 69 but with considerable capacity for adjustment. The disks are preferably, also, held by set-screws 75 extending through the projections 70 and bearing against the perimeters of the disks. Each disk is formed with an arcuate slot 76 to receive a link 77. The other ends of the link 77 are held between pairs of blocks 78 but with capacity for rocking movement, the pairs of blocks being secured by screws 79, one pair to the contact arm F and the other to the contact arm G above referred to. The contact arms F, G, consist of bowed spring members with their upper extremities secured in slots formed in blocks 80 fastened by binding posts 81 to an insulating block 82. The latter is secured by screws 83 to a hollow, rectangular bracket member 84 fastened by screws 85 to the inside of the upper housing member 50. The contacts F', G' consist of shorter bowed springs secured at one end in each case to the cross piece 86 of a bracket 87 fastened by the binding post 88 to block 82. The lower ends of these contact springs are bent around under the cross pieces 86 against which the springs normally bear, the cross pieces thereby forming stops for the springs.

When the contact is made between F and F', for example, the spring F' is pushed back. In breaking the circuit by retracting the spring F the springs will remain together until F' comes against the cross piece 86. As a result of this arrangement there is a quick, sharp separation between the contacts at just the point desired.

The springs F, G are much longer than the springs F', G' so that the former have a wiping movement on the latter when the springs come together and separate, which makes the contacting surfaces self-cleaning.

When the apparatus is used for controlling a three-position signal, as shown in Figs. 9 to 11 inclusive, the disks 71, 72 are set so that the slots 76 have different angular positions with respect to the lever. Thus in the arrangement shown the forward disk 71, which is connected with the contact arm G, is set so that the link connecting the disk to contact arm G will reach the bottom of the slot 76 before the link connecting the disk 72 to the contact arm F reaches the bottom of the corresponding slot in disk 72. The normal position of the parts is shown in Fig. 7, the contact members F, F' being directly behind the contact members G, G', respectively. When the lever is moved to the intermediate position so as to raise the semaphore arm C to the "caution" position, the position of the disks and contacts is shown in Fig. 8. Contact G is moved against contact G'. Contact F is moved toward contact F' but is not brought against it. In Figs. 1 and 2 the lever A is shown in the third position, the position in which the semaphore arm C is raised to "clear", and the disks and contacts are shown in the corresponding positions. The contact G pushes contact G' back a trifle. The contact spring F is brought against contact spring F'.

In order to adapt the controlling device for operating a signaling apparatus of the "normal clear" type, contacts $F^2$, $G^2$, are provided, against which the contact springs F, G, bear when the corresponding levers are in the position shown in Fig. 7. The springs $F^2$, $G^2$, are, in all respects, like springs F', G'. Each is secured to the cross piece 89 of a bracket 90 fastened to the block 82 by a binding post 91. The operation of the controlling apparatus, when utilizing the contacts $F^2$, $G^2$, in place of contacts F', G', to the control of the semaphore arm on the "normal clear" principle will be obvious.

When the controlling device is used in connection with a two-position signal, only one pair of contacts comes into play, the disks 71, 72, being adjusted so that the slots 76 therein stand in the same relative position with respect to the lever. The adjustability of the disks 71, 72, serves not only in the conversion of the device from a two-position to a three-position device and vice versa, but also enables the throw of the contact members F, G, to be varied so as to accurately effect the making and breaking of the circuits at the desired points.

While I have described my invention in a preferred embodiment and as applied to the control of a particular type of electrically actuated apparatus, modifications might be made in the structural features of the apparatus as described, and the apparatus might be employed in different connections from those shown without departure from the principles of the invention. Therefore, I do not wish to be understood as limiting the invention to the particular constructions, arrangements, devices and combinations shown except so far as said constructions, arrangements, devices and combinations are made specifically limitations in certain of the claims herein.

I claim:

1. In a controlling device for electrical apparatus, the combination with a lever, of a disk rotatably adjustable on said lever, a pair of spring contact members, a link connecting one of said members with said disk, and a stop which limits the movement of the other of said members toward the first specified member.

2. In a controlling device for electrical apparatus, the combination with a contact member and means for giving it angular movement, of a fixed supporting bracket having a cross-piece, a bowed spring contact member which extends around the cross-piece with one end secured to the face thereof adjacent to said first mentioned contact member, and the other end in the path of said member.

3. In a controlling device for electrical apparatus, the combination with a contact member and means for giving it angular movement, of a fixed supporting bracket having a cross-piece, a bowed spring contact member which extends around the cross-piece with one end secured to the face thereof adjacent to said first mentioned contact member, and the other end in the path of said member, said contact members having angular movement through arcs of different radius so as to produce a wiping movement of one against the other.

4. In a controlling device for electrical apparatus, the combination with a lever, of a disk rotatably adjustable on said lever and formed with a slot, a spring contact member, a link connecting the same with said disk through the slot therein, a bracket having a cross-piece, and a bowed spring contact member shorter than said first-named member, secured to the front face of said cross-piece with its other extremity projecting into the path of said first-named contact member.

5. In a controlling device for electrical apparatus, the combination with a housing adapted to be set into the top of a table and comprising upper and lower housing members, of a shaft supported in said housing, a pair of levers mounted on said shaft, contacts within said housing which are controlled by said lever, a web in said housing which intervenes between the levers and is formed with an opening therethrough, and an interlocking dog in said opening adapted to lock one of said levers in a given position except when the other lever is in a given position.

6. In a controlling device for electrical apparatus, the combination with a housing comprising an upper housing member adapted to be set into the top of a table formed with flanges secured to the underside of said table-top and with slots for levers and a lower housing member hinged to the upper housing member, of means for locking said housing members together, a shaft in said housing, levers mounted on said shaft, contacts within said housing controlled by said levers, and an interlocking dog between said levers whereby the position of one lever conditions the operation of the other.

7. In a controlling device for electrical apparatus, the combination with a controlling lever adapted to assume three positions, of two pairs of coöperating contacts, and connecting means between said lever and said contacts whereby, in one position of the lever, the contacts of both pairs are separated in another position, those of one pair are together and those of another pair separated, and in the third position the contacts of both pairs are together, said means being adjustable so that, when desired, the contacts of each pair may be brought together and separated simultaneously.

8. In apparatus for controlling a signaling apparatus having two separate circuits, the combination of a lever provided with means whereby it may be held fixed in different angular positions, two pairs of coöperating contacts, one in each circuit, rotatable means associated with said lever so as to be rotated by the movement thereof, and links connected with one of the contacts of each pair of contacts respectively, and having sliding connections with said rotatable means, arranged so that they are effectively engaged with said rotatable means at different angular positions of said lever.

9. In apparatus for controlling a signaling apparatus having two separate circuits, the combination of a lever provided with means whereby it may be held fixed in different angular positions, two pairs of coöperating contacts, one in each circuit, a pair of disks connected with said lever so as to be rotated thereby and provided with arcuate slots at different angular positions with respect to the axis of rotation of said disks, and links connected with one contact of each pair of contacts and having a sliding engagement with said disks in said slots.

10. In apparatus for controlling a signaling apparatus having two separate circuits, the combination of a lever provided with means whereby it may be held fixed in different angular positions, two pairs of cooperating contacts, one in each circuit, a pair of disks connected with said lever so as to be rotated thereby and provided with arcuate slots at different angular positions with respect to the axis of rotation of said disks, and links connected with one contact of each pair of contacts and having a sliding engagement with said disks in said slots, said disks being independently adjustable so that said pairs of contacts may be brought together and separated simultaneously.

11. In apparatus of the character described, the combination with two rotatable elements having the same axis of rotation and provided with handles for manipulation and with means for holding said elements in different fixed angular positions, sets of contacts adapted to be brought together and separated by rotation of said elements, respectively, a locking dog supported in position parallel to the axis of rotation of said elements and slidable in the direction of its length, said rotatable elements comprising members having surfaces against which the ends of the dog are adapted to bear, and differently positioned notches of equal depth, the length of the locking dog being equal to the distance between said surface plus the depth of one of said notches.

12. In apparatus for controlling an electrically operated, three-position signaling apparatus, the combination with a slotted housing, a lever pivoted within said housing and extending through the slot therein, means whereby said lever may be engaged at different angular positions with the housing, a pair of disks concentric with the axis of rotation of the lever and connected with said lever by means which gives them capacity for rotational adjustment, said disks being formed with arcuate slots, a pair of fixed contacts, a pair of movable contacts coöperating with said fixed contacts, respectively, and links pivotally connected to said movable contacts and slidingly connected to said disks through the slots therein.

13. In apparatus for controlling an electrically operated, three-position signaling apparatus, the combination with a housing formed with parallel slots, levers pivoted within said housing on a common axis and extending through the slots therein, means whereby said levers may be engaged at different angular positions in the housing, two pairs of disks concentric with the axis of rotation of the levers, one pair being connected with one lever and the other pair with the other lever by means which gives them capacity for rotational adjustment, said disks being formed with arcuate slots, a pair of fixed contacts associated with each lever, a pair of movable contacts for each pair of fixed contacts coöperating with each pair of fixed contacts, links pivotally connected to said movable contacts and slidingly connected to said disks through the slots therein, arcuate members on said levers having differently positioned notches of equal depth, and a locking dog between said arcuate members slidably supported so as to be movable in the direction of its length, one end of which fits into one of said notches, the other end bearing against the outer surface of the other arcuate member.

EUGENE W. VOGEL.

Witnesses:
G. Y. SKINNER,
H. M. HUTCHINGS.

Copies of this patent may be obtained for five cents each, by addressing the "Commissioner of Patents, Washington, D. C."